United States Patent [19]
Godard

[11] Patent Number: 4,613,731
[45] Date of Patent: Sep. 23, 1986

[54] METHOD OF CANCELLING LISTENER ECHO IN A DIGITAL DATA RECEIVER, AND DEVICE FOR IMPLEMENTING SAID METHOD

[75] Inventor: Dominique Godard, LeRouret, France

[73] Assignee: International Business Machines Corp., Armonk, N.Y.

[21] Appl. No.: 403,193

[22] Filed: Jul. 29, 1982

[30] Foreign Application Priority Data

Sep. 8, 1981 [EP] European Pat. Off. ........ 81430028.1

[51] Int. Cl.$^4$ .............................................. H04B 3/22
[52] U.S. Cl. ................................... 179/170.2; 333/18
[58] Field of Search .............. 179/170.2, 170.6, 170.8; 370/32; 324/77 H; 333/18; 375/14, 15

[56] References Cited

U.S. PATENT DOCUMENTS

| | | | |
|---|---|---|---|
| 3,721,777 | 3/1973 | Thomas | 179/170.2 |
| 3,906,231 | 9/1975 | Meriaux et al. | 324/77 H |
| 3,947,768 | 3/1976 | Desblache et al. | 375/14 |
| 3,962,637 | 6/1976 | Motley et al. | 375/15 |
| 4,024,342 | 5/1977 | Croisier et al. | 375/15 |
| 4,106,102 | 8/1978 | Desblache | 364/724 |
| 4,243,935 | 1/1981 | McCool et al. | 324/77 H |
| 4,309,770 | 1/1982 | Godard | 375/14 |
| 4,329,655 | 5/1982 | Nojima et al. | 330/149 |

OTHER PUBLICATIONS

"The Synchronous Adaptive Kalman Receiver for Carrier Modulation Systems", Gaurdincerri et al., Cselt-/Rapporti Technic, vol. 4, No. 1, pp. 59-63, Mar. 1976.

Primary Examiner—Gene Z. Rubinson
Assistant Examiner—R. Vaas
Attorney, Agent, or Firm—John B. Frisone

[57] ABSTRACT

A listener echo canceller for a receiver made to receive data symbols $a_n$ transmitted at regular time intervals T. The received wave is first conventionally decoded to derive the received symbols therefrom, said symbols are the subjected to a bulk delay which has been determined for shifting the listener echo impulse response to the time reference origin. The delayed symbols are then processed to generate an echo replica which replica is then fedback to the decoder input for being subtracted therefrom.

5 Claims, 10 Drawing Figures

METHOD OF CANCELLING LISTENER ECHO IN A DIGITAL DATA RECEIVER, AND DEVICE FOR IMPLEMENTING SAID METHOD

BACKGROUND OF THE INVENTION

1. Field of the Invention

This invention concerns synchronous digital data transmission systems and, more particularly, an echo canceller for a digital receiver for use in such transmission systems.

2. Background of the Invention

In synchronous digital transmission systems, the bit sequence resulting from the digital coding of the signal to be transmitted, is first converted into a data symbol sequence. These symbols, then, are sequentially transmitted over a transmission channel, at a so-called signalling time interval T. The transmission is carried out upon modulation of a frequency carrier $f_c$, which modulation consists in having each symbol converted into a discrete value of one or several characteristics (amplitude, phase) of the carrier wave.

Due to the cost of the transmission channels, duplex transmissions are carried out, using two wire lines, whereas, four wires would normally be necessary, two for the emission and two for the reception. However, two to four wire conversion, and conversely, is carried out at each transmission station by means of a hybrid junction. The separation of both channels from each other could only be fulfilled with differential transformers adapted to the characteristic impedance of the transmission channel. In practice, the characteristic impedance of the transmission channel cannot be known perfectly (more particularly in the so-called switched network) and is time-varying which leads to unbalanced networks. As a consequence, undesired parasitic reflected waves, i.e. echoes, are generated within said unbalanced network. There are many types of echoes, including the so-called listener echo. This type of echo is the echo which appears in the receiver of the listening terminal. Said listener echo is derived from a transmitted signal which, after recirculating through the transmission system and therefore being delayed, adds itself to the normally received signal. This echo is a parasitic wave characterized not only by its delay but also by its phase which can be time-varying. The listener echo, therefore, is particularly difficult to control and eliminate from the received wave.

SUMMARY OF THE INVENTION

An object of this invention is to provide a listener echo canceller.

More specifically, the object of this invention is a process and device for tracking and cancelling the listener echo in a data receiver.

More specifically, the invention provides a listener echo tracking and cancelling means to be used in a data receiver provided with conventional equalizer and symbol decoding means, said listerner echo tracking and cancelling means including: bulk delay means for delaying the decoded data symbols and thus for shifting the listener echo to the time reference origin; listener echo replica generating means processing the delayed decoded data symbols to generate a listener echo replica; and, means for subtracting said replica from the received and undecoded signal.

BRIEF DESCRIPTION OF THE DRAWINGS

FIG. 1, is a schematic block diagram of a wired line which shows more particularly the path followed by the so-called listener echo wave (see double arrowed path) as compared to the normal signal path (see single arrowed path).

FIG. 1B, is a schematic diagram of the impulse responses of the channels which the received wave passes through.

DETAILED DESCRIPTION OF THE INVENTION

Figure 1A:
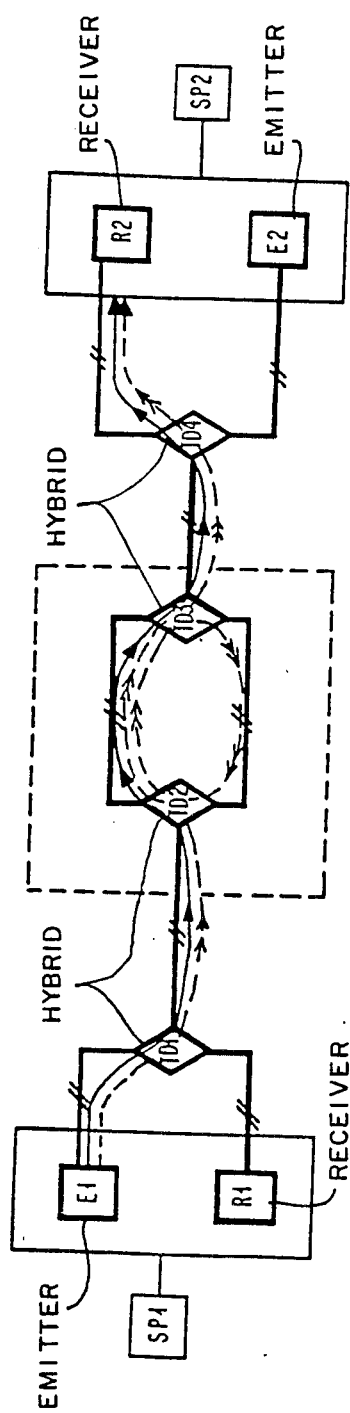

FIG. 1A is a block diagram of a wired line transmission channel between two terminals SP1 and SP2. The emitters and receivers for use with terminals SP1 and SP2 are designated by E1, E2 and R1, R2, respectively. Portions of the transmission channel between SP1 and SP2 are made of a single two-wire line, other portions include two two-wire lines, one for each transmission direction. Conversion from two to one line, and conversely, is acomplished in the transmission path connecting SP1 and SP2 together, by hybrid circuits or differential transformers TD1, TD2, TD3 and TD4 which provide two to four wire and vice versa conversion as illustrated in FIG. 1. Therefore, TD1 operates a two to four wire conversion, and conversely. Similarly, two to four wire conversion is also performed by TD2, TD3 and TD4. For instance, such a conversion may be performed at the TD2, TD3 location for amplification purposes. Normally, a transmission from SP1 to SP2 passes through E1, TD1, TD2, TD3, TD4 and R2. But parasitic waves (noise) such as the wave which would follow the dotted line path in FIG. 1A, are added to the normal wave which would follow the normal path mentioned above. For instance, the signal generated by SP1 after normally passing through TD1, TD2 and TD3, can partially be fed back to TD2, instead of being injected totally into the line leading to TD4, and then go back to TD3, and from there go to TD4 and reach receiver R2 with a delay with respect to the already normally received signal bearing the same data symbols.

Thus, parasitic signals are added to the signal normally received by SP2 and which has followed a normal path. These parasitic signals are called listener echo. The path followed by said echo is called an echo channel. This echo disturbs considerably the listening at SP2 and theferore should be cancelled from the received signal. But such an echo whose phase shift with respect to the normal wave, is time-varying (i.e. rolling echo) is particularly hard to track and cancel.

Before describing the device according to this invention for tracking and cancelling the listener echo, let us first give a few additional facts on the more specific invention context. The signal provided by terminal SP1 is fed into emitter E1 where it is subject to a number of operations before it is transmitted to listening terminal SP2. This emitter E1, as well as the one associated with the terminal SP2, operate according to the so-called double sideband quadrature carrier modulation techniques (DSB-QC). The term DSB-QC is used, here, in its widest meaning which includes all the systems wherein the transmitted signal can be represented by the combination of two amplitude-modulated quadrature carrier waves. More specifically, the term DSB-QC includes several techniques, e.g. phase-shift modulation, combined amplitude-and phase modulation, and quadrature modulation.

Figure 2:
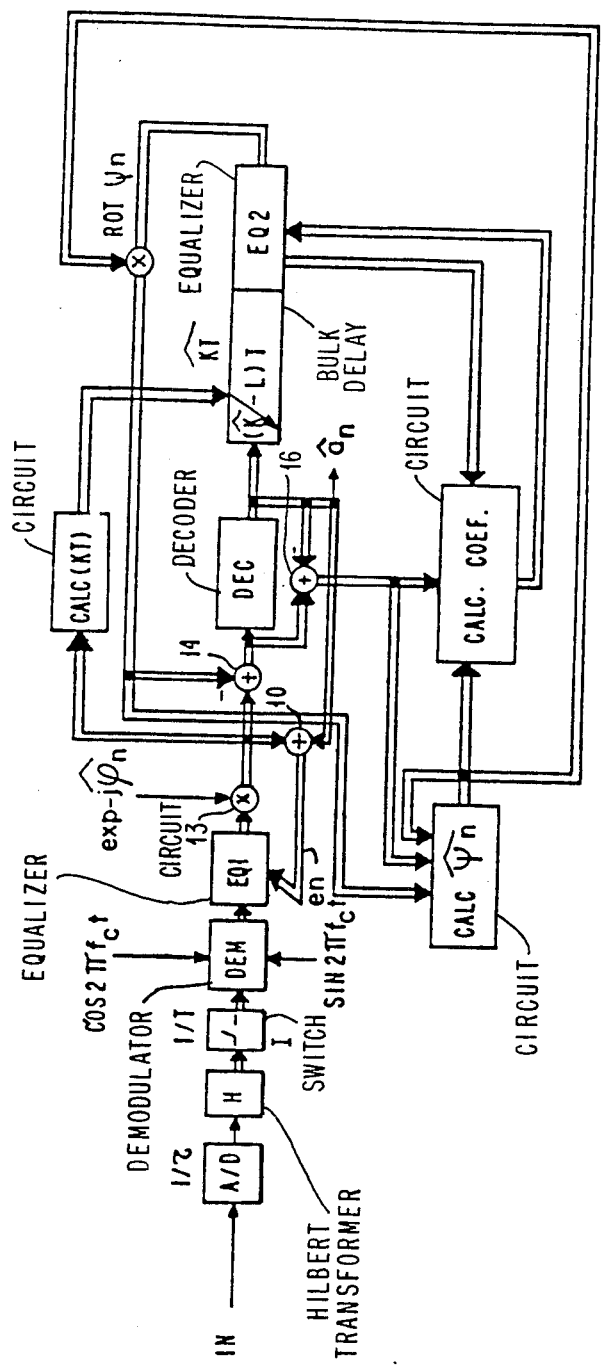
FIGS. 2, 2A and 3, are schematic diagrams of the data receiver incorporating the device of this invention.

As mentioned above, the signal transmitted by E1 follows both a normal transmission channel and an echo channel, and is received at input IN of the listening receiver R2 shown in FIG. 2. FIG. 2 is a schematic block diagram of a 9600 bits/sec receiver complying with Recommendation V29 of CCITT such as the receiver included in the IBM 3865 modem to which have been added elements for implementing this invention. The information signal received at IN, the energy of which has been conventionally normalized by an automatic gain control circuit (not shown) and which has been filtered by a bandpass filter (not shown) for rejecting noise, is applied to an analog to digital converter (A/D) where it is sampled at a rate $1/\tau$ and digitally coded. The rate $1/\tau$ is chosen to be equal to a multiple $m/T$ of the so-called signalling rate $1/T$ so that a number of samples sufficent to define the received signal are provided by the A/D circuits.

The received coded samples are fed to the input of a digital Hilbert transformer (H).

A Hilbert transformer is a complex filter which has one input and two outputs. Said outputs provide orthogonal components (i.e. in phase and quadrature components) of the input signal applied to its input. An example of such a device is disclosed in the article "Theory and Implementation of the Discrete Hilbert Transform" in "Digital Signal Processing" by L. R. Rabiner and C. M. Rader, 1972, IEEE Press.

The in-phase and quadrature components of the received signal which are supplied by the Hilbert transformer H are resampled at the signalling rate $1/T$ by sampling devices represented by a switch I. A clock (not shown) comprised of a digital phase locked oscillator controls sampling devices A/D and switch I, as well as the other elements of the receiver, through lines which are not shown. For details on the clock, reference should be made to copending U.S. application Ser. No. 156,140 filed June 3, 1980, now U.S. Pat. No. 4,320,517, assigned to same Assignee.

Let p(t) and r(t) be complex pulses representing impulse responses of the normal channel and of the listener echo channel, respectively. Then, the received signal includes a normal signal $x_1(t)$ defined by:

$$x_1(t) = Re \sum_n a_n p(t - nT) \exp j [2\pi f_c t + \phi(t)],$$

where

Re is indicative of the real component (the imaginary component will be referred to as Im), of the expression which follows the symbol Re, $a_n$ is indicative of the data symbol transmitted at time nT, exp is representative of the exponential operation, $j=\sqrt{-1}$, and $\phi(t)$ is a phase rotation due to the normal channel.

To this $x_1(t)$ signal a listener echo $x_2(t)$ adds itself, $$x_2(t) = Re \sum_n a_{n-K} r(t - nT) \exp j [2\pi f_c t + \chi(t)].$$

where $\chi(t)$ is a time varying phase shift due to the listener echo channel, and KT is indicative of the listener echo delay.

The received signal which carries information in the form of data symbols, is thus:

$$x(t) = Re \sum_n a_n p(t - nT) \exp j [2\pi f_c t + \phi(t)] +$$

$$Re \sum_n a_{n-K} r(t - nT) \exp j [2\pi f_c t + \chi(t)]$$

The in-phase and quadrature components of the received signal, available at the respective outputs of the sampling device I, are applied to the inputs of a complex demodulator DEM. Also applied to demodulator DEM are an in-phase carrier $\cos 2\pi f_c nT$ and a quadrature carrier $\sin 2\pi f_c nT$, both provided by a local source (not shown). The demodulator DEM provides in-phase and quadrature components of the demodulated received signal y(t) which can be expressed in its complex form by the following expression.

$$y(t) = \sum_n a_n p(t - nT) \exp j\phi(t) + \sum_n a_{n-K} r(t - nT) \exp j\chi(t) \quad (1)$$

where:

$$\phi(t) = \phi_o + 2\pi \Delta f_s t \quad (2)$$

$$\chi(t) = \chi_o + 2\pi \Delta f_e t \quad (3)$$

$\Delta f_s$ and $\Delta f_e$ are meant for the normal wave and the echo wave frequency shifts, respectively.

Figure 2A:
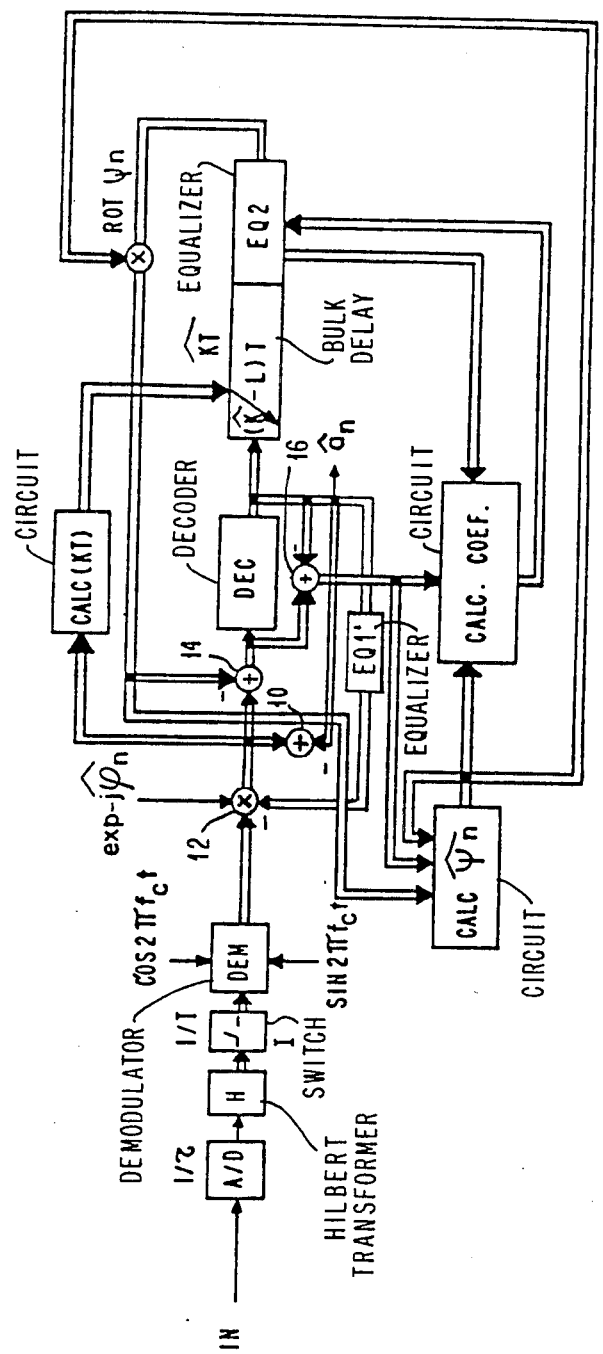

The in-phase and quadrature components of the demodulated received signal are fed to the inputs of a complex adaptive digital equalizer EQ1 an embodiment of which is disclosed in U.S. Pat. No. 3,947,768 to the same assignee. It should be noted that said equalizer EQ1 is provided with a device (not represented) for automatically adjusting its coefficients by using the error signal $e_n$ (see FIG. 2). Said error signal $e_n$ is provided by a subtractor 10, and is representative of the difference between the components of the equalized signal and those of the data symbol $\hat{a}_n$ sign "$\hat{}$" is used throughout this disclosure to make a distinction between the exact theoretical value and the estimated (measured) value, supplied by a decoder DEC (or detector) an embodiment of which is disclosed in U.S. Pat. No. 4,024,342 to the same assignee. However, since this invention applies to any type of equalizer, a recursive equalizer EQ'1 and an associated subtractor 12 as illustrated in FIG. 2A may be utilized in place of the equalizer EQ1 shown in FIG. 2. With this exception the circuits in FIGS. 2 and 2A are identical.

The in-phase and quadrature components of the equalized signal are respectively applied to the inputs of a conventional carrier phase adjusting circuit 13 before their being sent to decoder DEC (i.e. decision circuit) in charge of determining the received data symbols. Circuit 13 produces the components Re $z_n$ and Im $z_n$ of the equalized signal. The rest of the circuits illustrated in FIG. 2 constitute the listener echo canceller to be subsequently described in a more detailed manner.

Figure 1B:
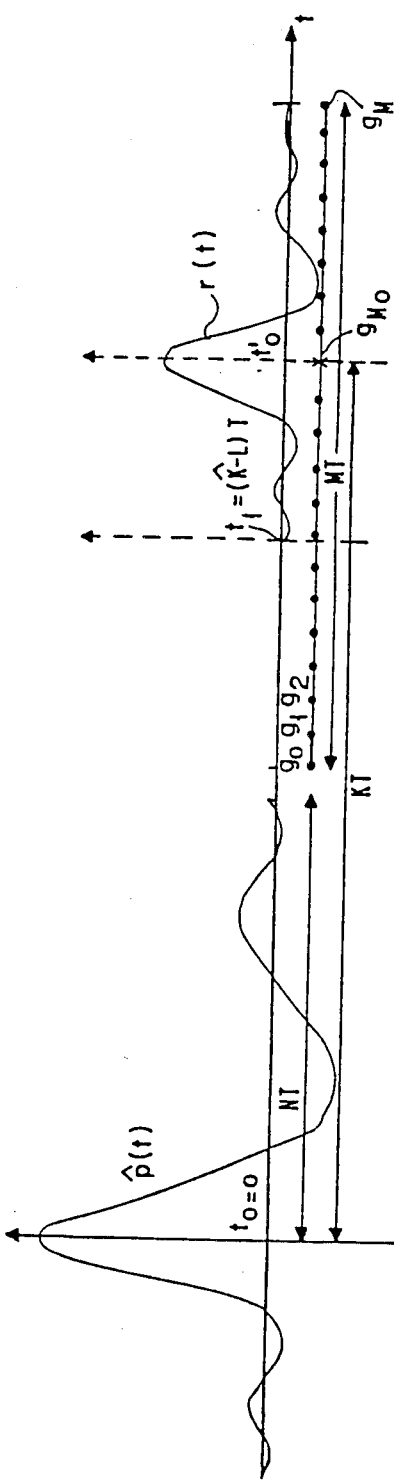

To facilitate a better understanding of the listener echo canceller, let us first analyze FIG. 1B. FIG. 1B illustrates a diagram of a combined impulse response including both impulse responses p(t) and r(t) of the channels which the received wave went through. Looking at this combined impulse response it appears that a single conventional equalization in EQ1 for the whole signal y(t), could do the whole job, i.e. include conventional equalization plus an equalization leading to listener echo cancellation. However the single equalizer to be used would be relatively long, thereby necessitating significant computing power which, in itself, would be a first drawback. But, in addition, such a single equalizer is practically inoperative in cancelling the listener echo due to $\Delta f_s$ and $\Delta f_e$ not being equal to one another. These remarks emphasize the importance of the system according to this invention, which handles the first equalized signal (decoded or detected as disclosed further on) by putting into the receiver circuit a bulk delay device for shifting the echo back to the time reference origin, and by generating an echo replica which is then subtracted from the decoded received signal.

Now, going back to FIG. 2, the complex signal processed by the decoder is in the form $$a_n + \Sigma a_{n-K-k} h_k \exp j\psi_n + \omega_n \qquad (4)$$

where $\omega_n$ is representative of noise and residual intersymbol interference at time nT; the set $\{h_k\}$ is comprised of coefficients $h_k$ derived from the discrete convolution of r(t) with the impulse response of equalizer EQ1; and $\omega_n$ is representative of the value at time nT of the phase shift, i.e. phase rotation which the listener echo is subject to, which phase shift is considered here at the output of equalizer EQ1 and phase adjusting circuit 13.

In a first approximation, one can write:

$$\psi_n = \psi_0 + 2\pi(\Delta f_e - \Delta f_s)nT \qquad (5)$$

For the tracking and cancelling operation of the listener echo, the decoded signal components Re $\hat{a}_n$ and Im $\hat{a}_n$ supplied by decision circuit DEC (decoder or detector) will be transmitted, through a bulk delay circuit KT; to a listener echo equalizer EQ2 the output of which is subject to a $\hat{\psi}_n$ phase rotation operation in the echo phase adjusting device ROT $\hat{\psi}_n$ (see FIG. 1B and the details given further on about the listener echo delays). The ROT $\psi_n$ output which is representative of replica $q_n$ is subtracted in 14 from signal $z_n$ which has for components Re $z_n$ and Im $z_n$. These components Re $z_n$ and Im $z_n$ are fed into a circuit CALC ($\hat{K}T$) which measures (estimates) the bulk delay of the parasitic echo wave with respect to the normal wave, to be used for adjusting the estimated bulk delay circuit (KT). This bulk delay circuit (KT) is used to shift the time reference origin from $t_o$ to $t'_o$ (see FIG. 1B). In addition, DEC output information is subtracted in 16 from DEC input to derive therefrom error information on the detected data symbols, which error is referred to as echo error $\epsilon_n$. Such echo error is fed into a coefficient adjusting circuit CALC COEF used to adjust the coefficients of a second equalizer, i.e. the so-called listener echo equalizer EQ2. The circuit CALC COEF computes the coefficients of the echo equalizer EQ2, therefore, making it possible to automatically adjust said echo equalizer. Finally, an echo phase tracking circuit CALC $\hat{\psi}_n$ is used to track the echo phase shift $\psi_n$ and adjust an echo replica $q_n$ to be defined more precisely, subsequently ($q_n$ being more specifically representative of the discrete values of an echo replica "q" which values are defined at times nT). The echo phase is adjusted into a phase shifting device ROT $\hat{\psi}_n$.

It should be noted that circuit CALC $\hat{\psi}_n$ is provided with a feedback loop. It should also be noted that the information provided by circuit CALC $\hat{\psi}_n$ is fed to circuit CALC COEF which is also fed with elements of information provided by the echo equalizer EQ2.

Figure 3:
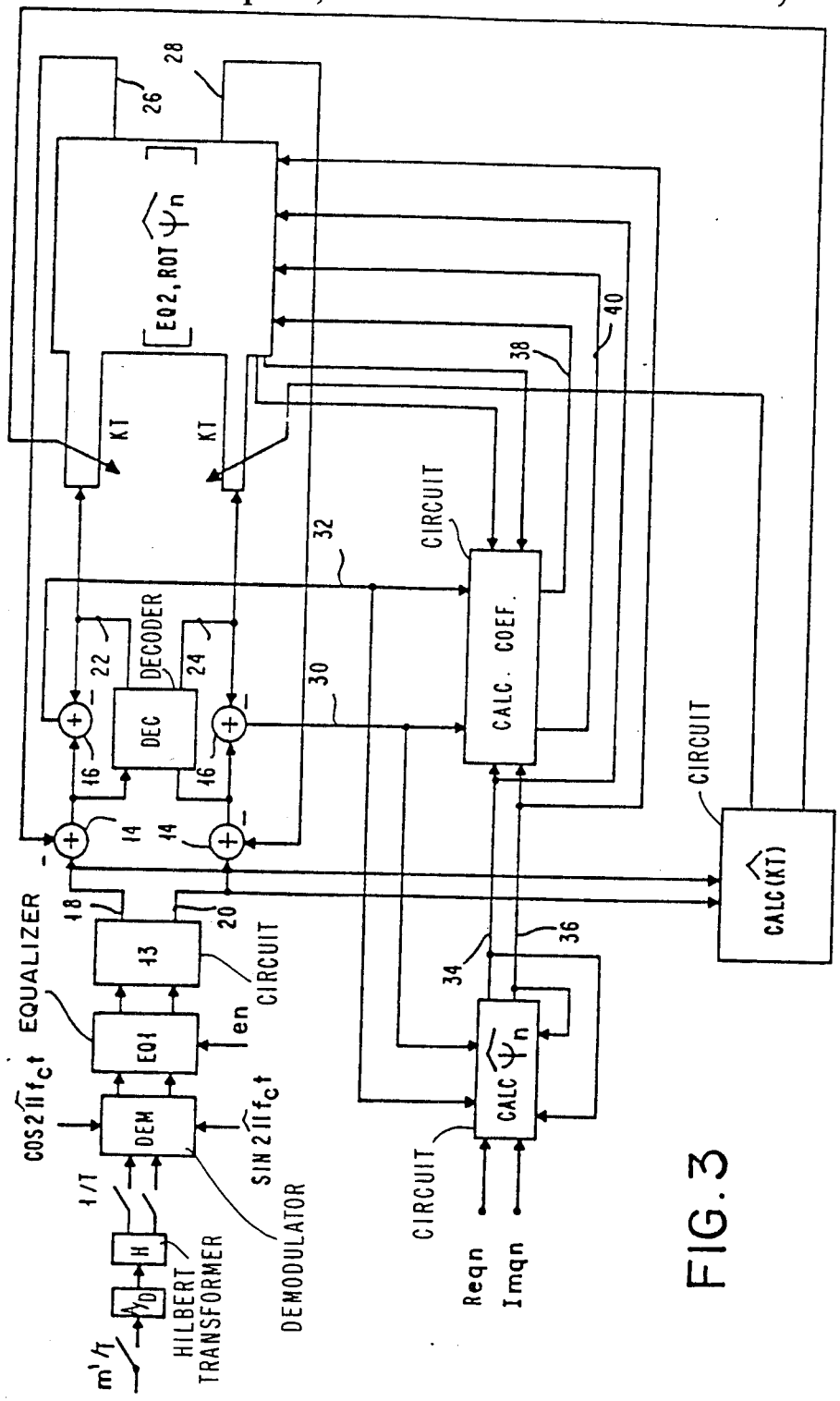

FIG. 3 is a reproduction of FIG. 2, which shows more specifically the separations between real components (in-phase components) and imaginary components (quadrature components) of the various elements of information throughout the receiver. This explains why subtractors 14 and 16 have, each, been represented by two subtractors, one for each component. For the same reason, circuit $\hat{K}T$ has been split into two sections.

The outputs of circuit 13, outputs referenced 18 and 20, provide the components Re $z_n$ and Im $z_n$, respectively. Likewise, Re $\hat{a}_n$ and Im $\hat{a}_n$ are provided by decision circuit DEC, through lines 22 and 24, respectively. The echo equalizer EQ2 and echo phase adjusting device ROT $\hat{\psi}_n$ provide the echo replica components Re $q_n$ and Im $q_n$ over wires 26 and 28, respectively. Likewise, subtractors 16 provide the echo error imaginary component Im $\epsilon_n$ (wire 30) and real component Re $\epsilon_n$ (wire 32).

The echo phase tracking circuit CALC $\hat{\psi}_n$ provide the phase components Re $\hat{\psi}_n$ (over wire 34) and Im $\hat{\psi}_n$ (over wire 36). Finally, components Re $h_{l(n+1)}$ and Im $\hat{h}_{l(n+1)}$ which are transmitted over wires 38 and 40, respectively are provided by the coefficient adjusting circuit CALC COEF. This device CALC COEF, in addition, is fed with values RE $\hat{a}_{n-\hat{K}-l}$ and Im $\hat{a}_{n-\hat{K}-l}$ which are derived from the echo equalizer EQ2 the details of which will be given further on.

Figure 4:
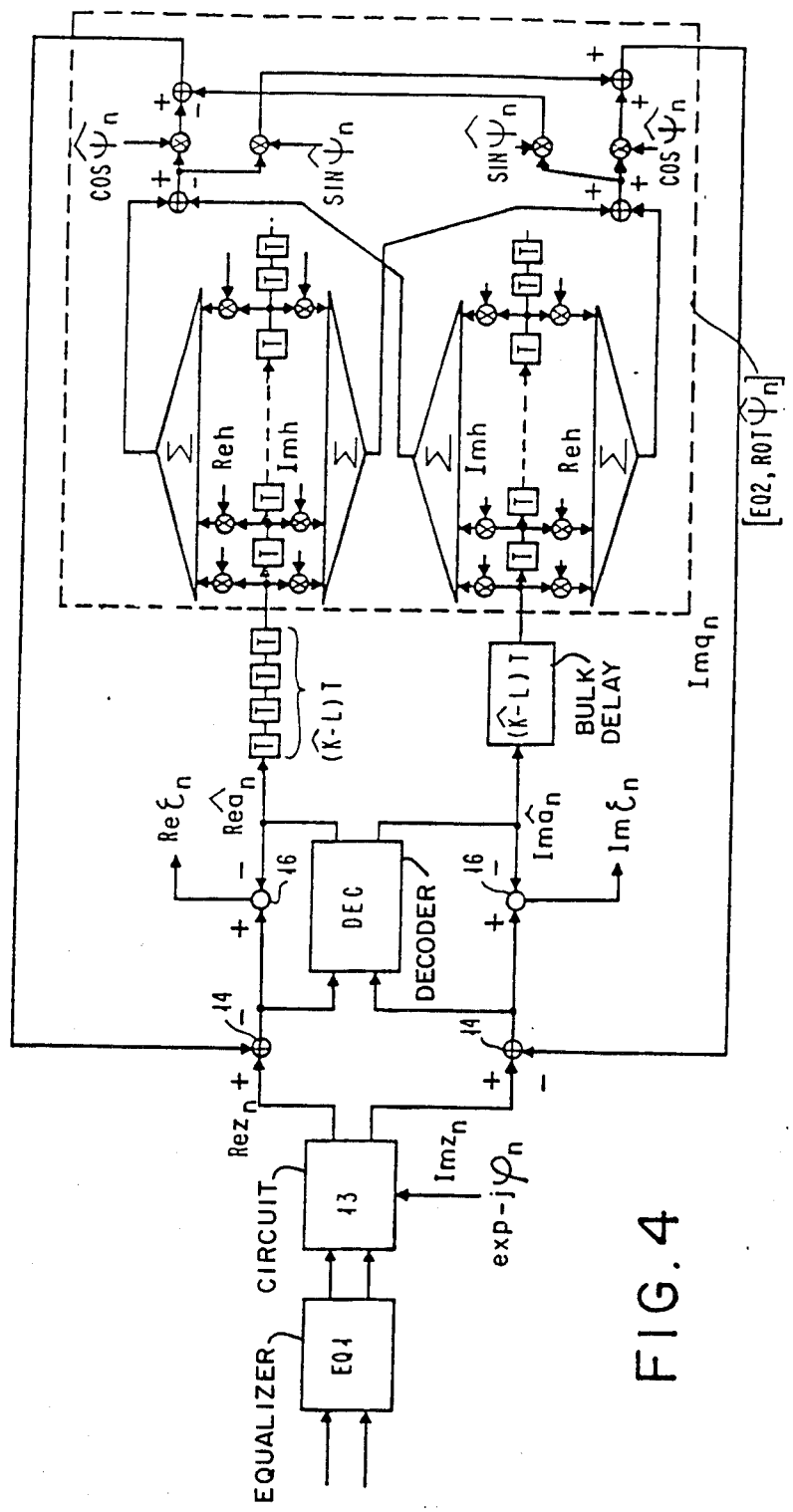
FIG. 4 shows in detail a portion of the device of FIG. 3.

FIG. 4 represents a portion of FIG. 3 illustrating in a detailed manner an embodiment of echo equalizer EQ2 and of echo phase adjusting device ROT $\hat{\psi}_n$. The echo equalizer EQ2 general architecture is made according to the same principles used for equalizer EQ1 and disclosed in U.S. Pat. No. 3,947,768. These equalizers include multiplier circuits to be dynamically adjusted by adjusting their coefficients, referenced h, for the listener echo equalizer. This adjustment is carried out by device CALC COEF shown in FIG. 7. As to the phase adjustments $\hat{\psi}_n$ performed by operating cos $\hat{\psi}_n$ and sin $\hat{\psi}_n$ multiplications over the echo equalizer EQ2 outputs, they require a tracking operation of phase $\psi_n$, which tracking operation is carried out by the device shown in FIG. 8. Prior to any operations for automatically adjusting the equalizer and echo tracking circuit, the echo impulse response should be shifted to time reference origin. Thus, the bulk delay KT value (FIGS. 5 and 6) should be first determined; then, the bulk delay device designated by KT in FIGS. 2 and 3 should be adjusted. This adjustment is made to compensate for the delay of the echo signal wave with respect to the normal signal wave. In other words, the bulk delay circuit shifts the time origin reference from "$t_o$" to "$t'_o$". With such a new time reference, the echo equalizer EQ2 will operate directly upon the listener echo (impulse response r(t) and, this, with a minimum number of coefficients.

For a better understanding of the operation of the device according to this invention, it should be noted that, since the data symbols are uncorrelated, one can write:

$$Ea_n^* a_{n-m} = 0,$$

$$V_m \neq 0.$$

E represents the mathematical expectation,
* represents the complex conjugated quantity,
$V_m \neq 0$ represents "any integer value for m" different except zero.

In addition, when considering a data symbol system wherein cartesian coordinate representation of said data symbols is arranged as a constellation with many symmetries, $$Ea_n^2 = 0 \tag{6}$$

Thus:

$$E[e_n e_{n-1}^* a_{n-K-p}^* a_{n-K-p-1}] = (E|a_n|^2)^2 |h_p|^2 \exp j2\pi(\Delta f_e - \Delta f_s)T \tag{7}$$

where
| | is indicative of the modulus (absolute value), and $h_p$ is the $p^{th}$ coefficient of equalizer EQ2.

For $|\Delta f_e - \Delta f_s|$ up to about 10 Hz, exp $j2\pi(\Delta f_e - \Delta f_s)T$ is slightly different from unity. It results therefrom that only the real portion of expression (7) need be considered; i.e.

$$ReE[e_n e_{n-1}^* a_{n-K-p}^* a_{n-K-p-1}] \approx (E|a_n|^2)^2 |h_p|^2 \tag{8}$$

Let N be the number of the coefficients of equalizer EQ'1 (if such a recursive equalizer is to be used, within the receiver and connected as shown in FIG. 1) or let N be the difference, expressed in number of coefficients, between the length of equalizer EQ1 and the delay introduced by equalizer EQ1 (if such a transversal equalizer is used). In the latter situation, i.e. use of transversal equalizer, N will be considered as being equal to half the number of the coefficients of EQ1). One may thus determine $g_l$ coefficients based on the following equation:

$$g_l = R_e E e_n e_{n-1}^* a_{n-N-l}^* a_{n-N-l-1} \tag{9}$$

for $l = 0, 1, 2, \ldots, M_o, \ldots, M$, where M is a predetermined integer value selected such that N+M be slightly higher than K+L, with 2L+1 being the number of coefficients selected for use within the echo equalizer EQ2 in accordance with conventional equalization techniques.

The $g_l$'s can be iteratively estimated, based on the following equation:

$$g_l(n+1) = (1-\lambda)g_l(n) + \lambda Re[e_n e_{n-1}^* a_{n-N-l}^* a_{n-N-l-1}] \tag{10}$$

$\lambda$ can be chosen equal to 0.002, when impulse p(t) energy has been normalized to one.

The echo delay KT can then be determined by locating the largest $g_l$ within the set of computed $g_l$'s. Such a determination is carried out by the circuits of FIGS. 5 and 6 which are all comprised within CALC (KT). It should be assumed that the equalizer EQ1 and the carrier phase regulating device 13 have been adjusted beforehand according to a conventional method such as, for instance, the method disclosed in the above-mentioned U.S. Pat. No. 3,947,768 while all of the echo equalizer EQ2 coefficients are set to zero. The circuit of FIG. 5, then, performs the operation in equation (10) to derive a set of coefficients $g_l$'s from a predetermined sequence of data symbol $a_n$ (a so-call training sequence) received by the receiver of FIG. 2. In addition, a replica of such a training sequence is stored in an initialization sequence generator GENE. One could also store in GENE and utilize thereafter data symbols supplied by decoder DEC and derived from a received training sequence. This replica supplies the two components of each symbol $a_n$, namely, component Re $a_n$ which is subtracted from Re $z_n$, in circuit 25 to provide Re $e_n$, and component Im $a_n$ subtracted from Im $Z_n$, in circuit 27, to provide Im $e_n$. The component Re $e_n$ is simultaneously fed into two multipliers 28 and 30 and into a T delay circuit designated by 32. Component Im $e_n$ is also fed into two multipliers 34 and 36 and into a delay circuit 38. The output of multiplier 28 is added to the output of multiplier 34, in adder 40, to generate the real portion of the product $e_n \cdot e_{n-1}^*$. The output of multiplier 30 is subtracted from the output of multiplier 36, in circuit 42, to generate the imaginary portion of product $e_n \cdot e_{n-1}^*$. The assembly which is comprised of the two delay cells 32 and 38, multipliers 28, 30, 34, 36, adder 40 and subtractor 42, has been designated by COMBI 1. The output of adder 40 provides the quantity:

$$Re e_n \cdot Re e_{n-1} + Im e_n \cdot Im e_{n-1} = Re[e_n \cdot e_{n-1}^*].$$

likewise, quantity:

$$Re e_{n-1} \cdot Im e_n - Re e_n \cdot Im e_{n-1} = Im[e_n \cdot e_{n-1}^*].$$

is obtained at the output of subtractor circuit 42.

The components Re $a_n$ and Im $a_n$ are fed into NT delay circuits referenced 44 and 46 and which generate Re $e_{n-N}$ and Im $a_{n-N}$, respectively. The outputs of circuits 44 and 46 are fed into circuit COMBI 2 which is similar to COMBI 1 and which generates $$Re a_{n-N} \cdot Re a_{n-N-1} + Im a_{n-N} \cdot Im a_{n-N-1} = Re[a_{n-N} \cdot a_{n-N-1}^*]$$

on output 48, and $$Re a_{n-N-1} \cdot Im a_{n-N} - Re a_{n-N} \cdot Im a_{n-N-1} = Im[a_{n-N} \cdot a_{n-N-1}^*]$$

on output 50.

The outputs of circuits 40 and 42 are respectively multiplied in circuits 52 and 54 by the quantities provided on the outputs 48 and 50 of circuit COMBI 2. The outputs of multipliers 52 and 54 are substracted from one another in circuit 56. Circuit 56, therefore, generates the quantity:

$$Re e_n e_{n-1}^* a_{n-N}^* a_{n-N-1} \tag{11}$$

Such a quantity is multiplied by $\lambda$ in 58. The output of multiplier 58 goes through adder 60 the output of which is delayed by a signalling time-period T, in circuit 62. The output of 62 is multiplied by 1−80 in circuit 64. The output of 64 is fed into adder 60. Therefore, quantity:

$$g_o(n+1) = (1-\lambda)g_o(n) + \lambda Re[e_n \cdot e_{n-1}^* \cdot a_{n-N}^* \cdot a_{n-N-1}] \tag{12}$$

is obtained at the output of adder 60.

The circuit carrying out the operations (12), then, performs the function of equation (10) for l=0.

Figure 5:
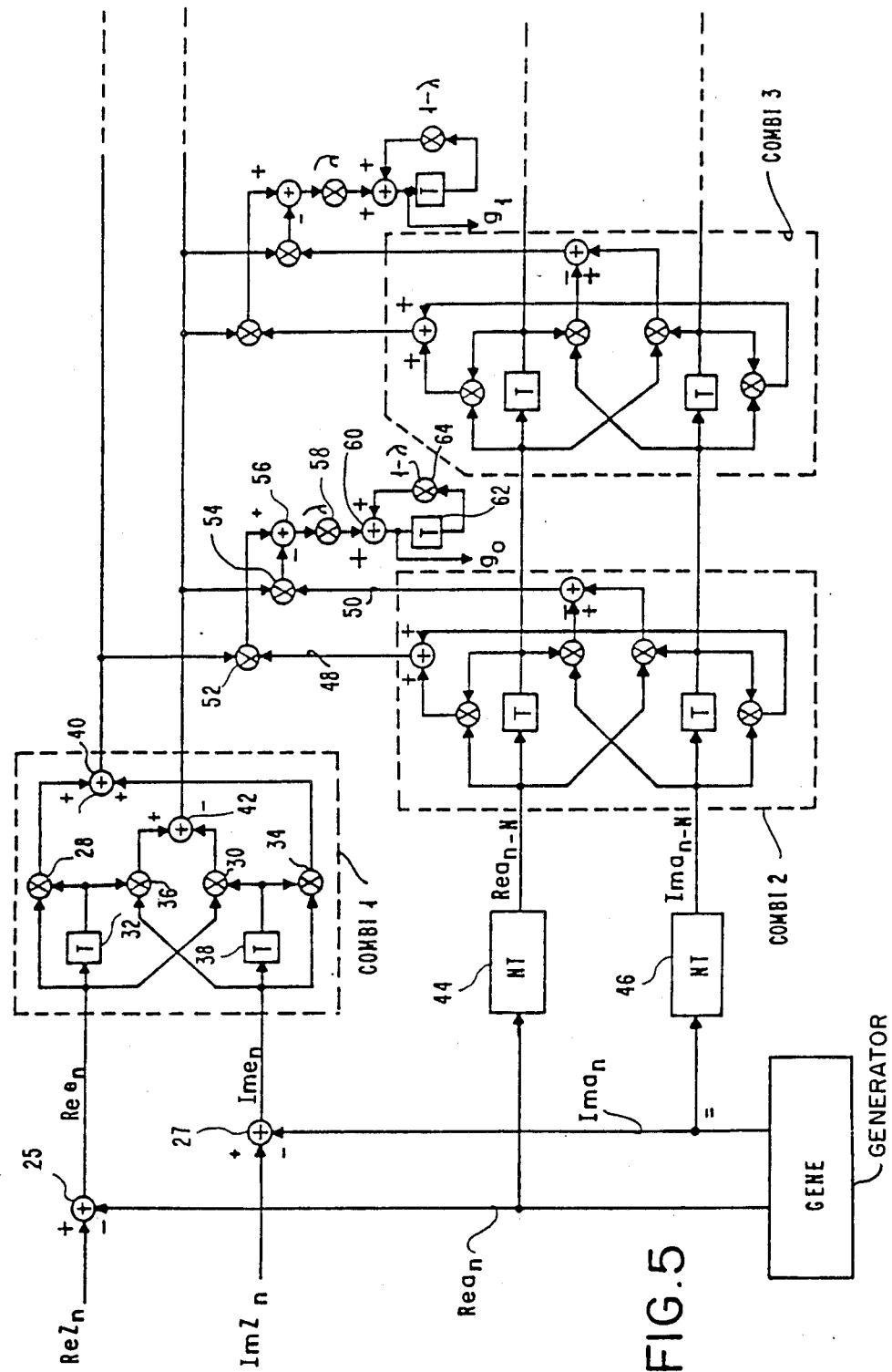
FIGS. 5 and 6 illustrate an embodiment of the device (CALC KT) shown in FIG. 3.
Figure 6:
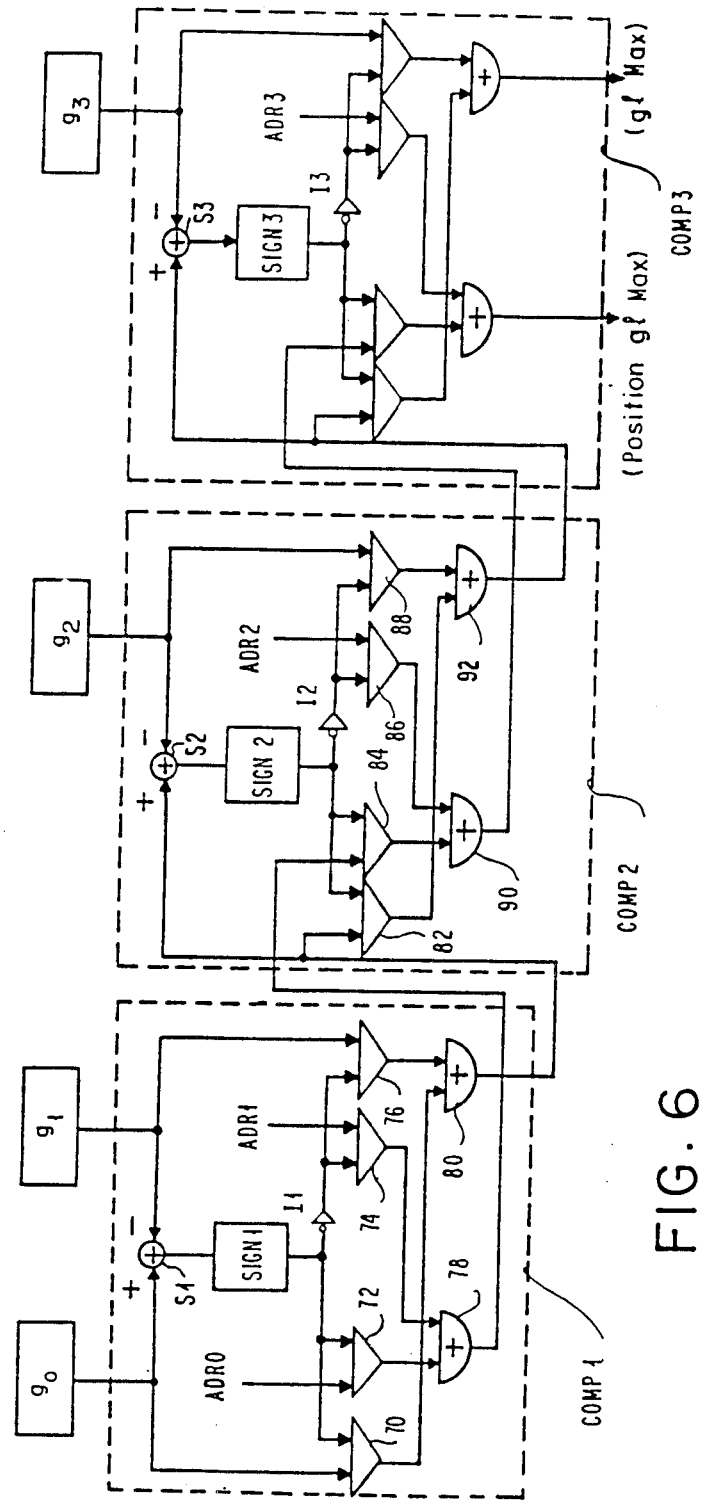

Then, using another cell (COMBI 3) with the associated circuits similar to those which have been described, and the assembly being connected according to the schematic diagram shown in FIG. 5, one obtains:

$$g_1(n+1)=(1-\lambda)g_1(n)+\lambda Re[e_n \cdot e_{n-1}^* \cdot e_{n-N-1}^* \cdot a_{n-N-2}] \quad (13)$$

When proceeding in a similar manner, $g_2$, $g_3$, etc. will be computed. In other words, the terms $g_l$ for l=0, 1, 2, ..., $M_o$, ..., M are generated. These quantities $g_l$ will be used to determine the listener echo bulk delay KT. For that purpose, the position of the largest $g_l$, i.e. $gM_o$ should be determined. This position can be determined by any sorting operation or by making use of the circuit shown in FIG. 6. In that case, terms $g_o$, $g_1$, $g_2$, $g_3$ (only four terms have been used, just for simplifying the explanation) are stored at sequential addresses ADR0, ADR1, ADR2 and ADR3 respectively. The values of $g_o$ and $g_1$ as well as their addresses, are fed into a first comparing stage COMP1. The value of $g_1$ is subtracted from $g_o$ in S1. The sign of the difference is determined in SIGN1. This sign controls the conditioning of logic gates 70 and 72, whereas its inverse (supplied by inverter I1) controls the conditioning of gates 74 and 76.

The value of $g_o$ and $g_1$, are fed to the inputs of gates 70 and 76, respectively, whereas gates 72 and 74 receive the addresses ADR0 and ADR1, respectively. The outputs of gates 72 and 74 are ORed into logic OR circuit 78. The outputs of gates 70 and 76 are ORed into logic OR circuit 80. The output of circuit 80, therefore, is indicative of the largest g value between $g_o$ and $g_1$, a value the address of which is indicated by circuit 78. The output of circuit 80 fed into the (+) input of substractor S2 the (−) input of which is fed with $g_2$. The output of circuit 80 is also fed into the input of gate 82 whereas the output of circuit 78 is fed into the input of gate 84. Gates 82 and 84 belong to a second comparing stage COMP2 similar to COMP1 and which compares $g_2$ to the largest value between $g_o$ and $g_1$, a largest value the address of which is compared with ADR2. The outputs of COMP2 are fed into a third comparing stage COMP3 which is also provided with $g_3$ and its address ADR3. Therefore, the value $gM_o$ of the largest $g_l$ together with its position (address), are available at the output of COMP3. This position determines the relative position ($M_o$) of the central coefficient or tap of the echo equalizer EQ2.

The estimated value of $\hat{K}$, then, can be derived from formula:

$$\hat{K}=N+M_o+1 \quad (14)$$

Once $\hat{K}$ is known, the bulk delay devices KT are adjusted. As illustrated in FIG. 4, a number of delay cells T have been provided on the path of the detected symbols $\hat{a}_n$, i.e. on both Re $\hat{a}_n$ and Im $\hat{a}_n$ paths. In addition, as mentioned above while the $g_l$'s, are being computed, the echo equalizer EQ2 coefficients are set to zero. Once the largest $g_l$ (namely $gM_o$) is located, it is positioned on the delay line formed of delay elements T arranged on the path of the detected symbols $\hat{a}_n$. The equalizer EQ2 is thus positioned with its central coefficient positioned on $M_o$, i.e., on the $K^{th}$ cell of the delay line arranged on the path of the detected data symbols.

The time reference origin, is thus shifted from "$t_o$" to "$t'_o$" for the equalizer EQ2.

Once the bulk delay device (KT) has been adjusted, the equalizer of the echo canceller is operated to build the echo replica q by computing its samples $q_n$ so that:

$$q_n = \sum_{l=-L}^{L} a_{n-\hat{K}-l} \hat{h}_l \exp j\hat{\psi}_n \quad (15)$$

The echo replica components Re $q_n$ and Im $q_n$ are subtracted from components Re $z_n$ and Im $z_n$, in 14, respectively. The outputs of subtractors 14 are fed into the (+) inputs of substractors 16 the (−) inputs of which are provided with the quantities Re $\hat{a}_n$ and Im $\hat{a}_n$, respectively. The components of the echo error signal $\epsilon_n$, are thus provided by substractors 16, which components are used to adjust the estimated coefficients $\hat{h}_l$ of echo equalizer EQ2 (where l is now representative of the coefficient rank within the echo equalizer). Said error signal $\epsilon_n$ is also used to adjust the phase $\hat{\psi}_n$. The quantities $\hat{h}_l$ and $\hat{\psi}_n$ are derived from the gradients of $E|\epsilon_n|^2$ with respect to $\hat{h}_l$ and $\hat{\psi}_n$. The quantities $\hat{h}_l$ and $\hat{\psi}_n$ satisfy the relations:

$$\hat{h}_l(n+1)=\hat{h}_l(n)+\lambda_h \epsilon_n \exp -j\hat{\psi}_n \hat{a}_{n-\hat{K}-l} \quad (16)$$

$$\hat{\psi}(n+1)=\hat{\psi}_n+\lambda_\psi Im q_n^* \exp -j\hat{\psi}_n \quad (17)$$

where $\lambda_h$ and $\lambda_\psi$ are predetermined fixed positive coefficients selected as a compromise for getting relatively quick convergence of equations (16) and (17). When these coefficients are chosen too high, expressions (16) and (17) diverge; when they are chosen too small, these expressions converge but too slowly.

In practice, one considers:

$$\lambda_h < \frac{1}{N2 \cdot E|a_n|^2} \simeq \frac{1}{4}\left(\frac{1}{N2 \cdot E|a_n|^2}\right)$$

where

N2 stands for the number of coefficients of echo equalizer EQ2.

$$\lambda_\psi < \frac{1}{E|\epsilon_n|^2} \simeq \frac{1}{4}\frac{1}{E|\epsilon_n|^2}$$

Figure 7:
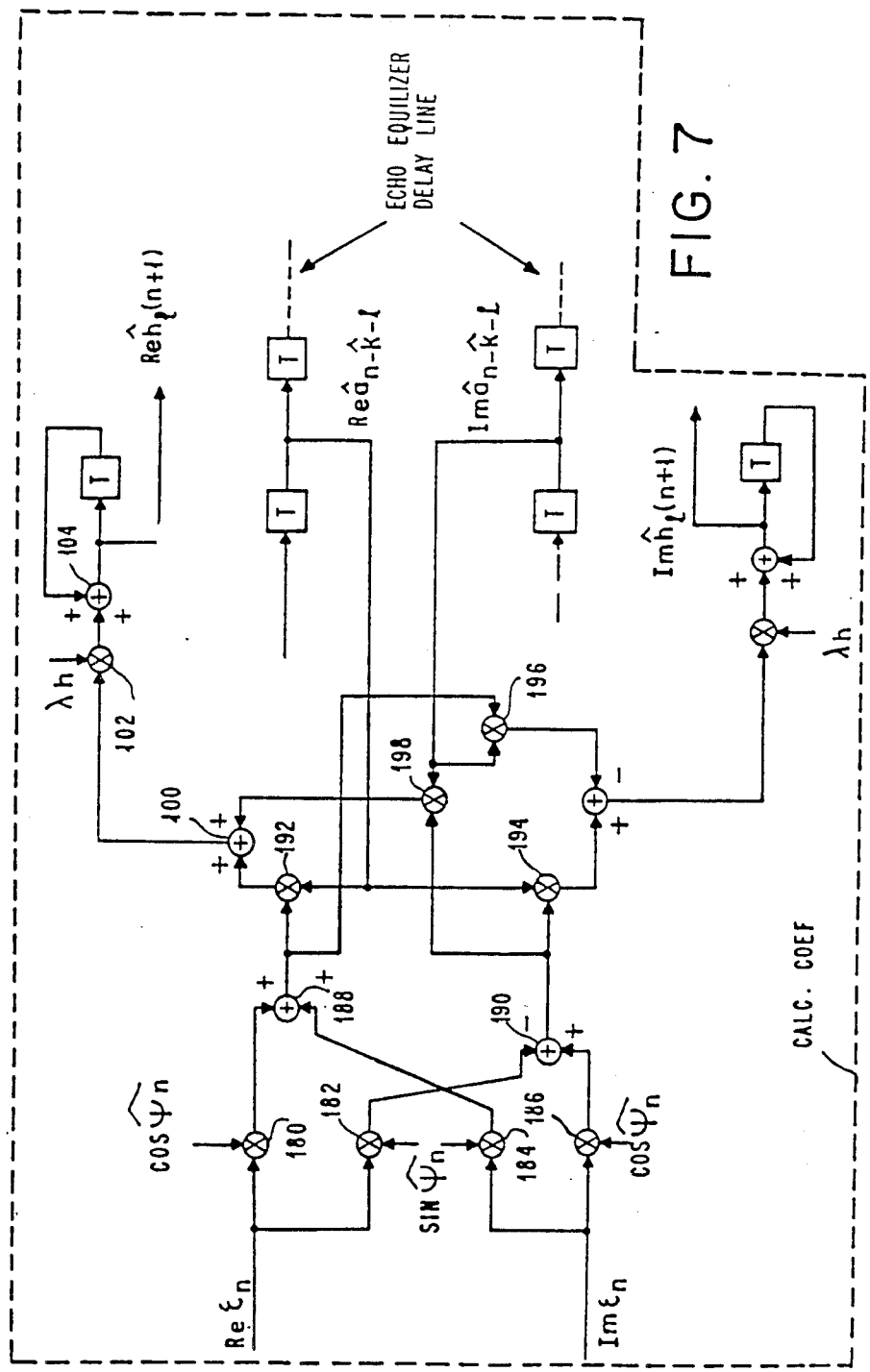
FIG. 7 illustrates an embodiment of the device (CALC COEF) shown in FIG. 3.

The circuit of FIG. 7 is used to adjust the coefficients h of echo equalizer EQ2 by effecting the operations of formula (16) after initialization of said coefficients according to the conventional digital equalization methods. Component Re $\epsilon_n$ is multiplied by cos $\hat{\psi}_n$ in 180 and by sin $\hat{\psi}_n$ in 182, whereas component Im $\epsilon_n$ is multiplied by sin $\hat{\psi}_n$ in 184 and by cos $\hat{\psi}_n$ in 186. The outputs of multipliers 180 and 184 are added to each other in 88 whereas the outputs of multipliers 182 and 186 are subtracted from each other in 190. The outputs of circuits 188 and 190 are multiplied in 192 and 194 by Re $\hat{a}_{n-\hat{K}-l}$ (provided by the $l^{th}$ cell of the delay line portion of that part of equalizer EQ2 which receives component Re $\hat{a}_{n-\hat{K}}$). These outputs of circuits 188 and 190 are multiplied by Im $\hat{a}_{n-\hat{K}-l}$ in 196 and 198, respectively. The outputs of 192 and 198 are added to each other in adder 100. The output of adder 100 is multiplied by $\lambda_h$ in multiplier 102. The Quantity:

$$Re[\lambda_h \epsilon_n \exp -j\hat{\psi}_n \hat{a}_{n-\hat{K}-l}] \quad (18)$$

is thus obtained at the output of multiplier 102.

Quantity $\hat{h}_{l(n)}$, is added in 104 to the quantity defined by 18 which is provided by multiplier 102, to obtain quantity Re $\hat{h}_{l(n+1)}$ at the output of 104.

A similar process leads to the computation of Im $\hat{h}_{l(n+1)}$ by using the lower portion of the circuit of FIG. 7.

Figure 8:
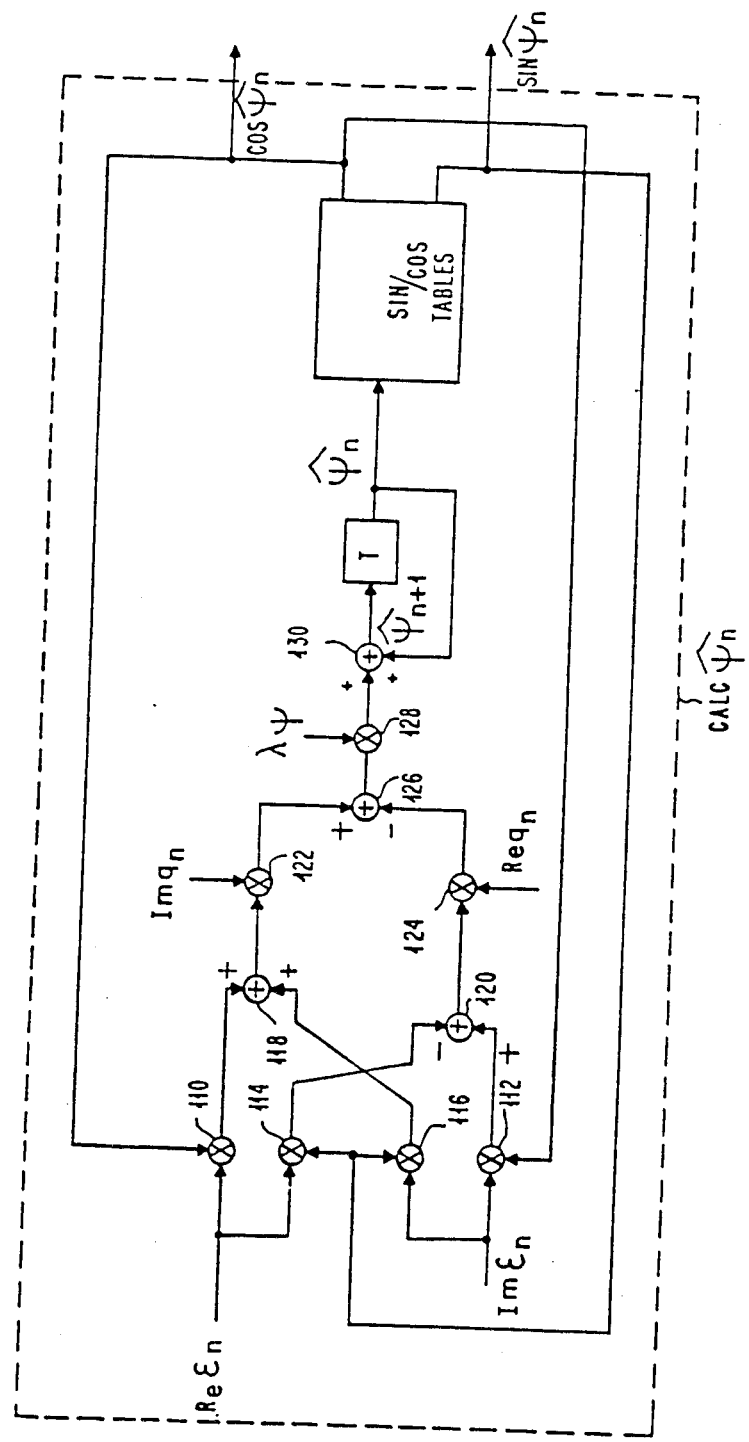
FIG. 8 illustrates an embodiment of the device (CALC $\hat{\psi}_n$) shown in FIG. 3.

The circuit shown in FIG. 8 determines quantities sin $\hat{\psi}_n$ and cos $\hat{\psi}_n$. For that purpose, the components Re $\epsilon_n$ and Im $\epsilon_n$ are multiplied by cos $\hat{\psi}_n$ in 100 and 112 and by sin $\hat{\psi}_n$ in 114 and 116. The outputs of 110 and 116 are added together in 118 and subtracted from each other in 120. The outputs of 118 and 120 are multiplied by Im $q_n$ in 122 and by Re $q_n$ in 124, respectively. The outputs of 122 and 124 are subtracted from each other in 126. The output of 126 is multiplied by $\lambda_\psi$ in 128. The output of multiplier 128 is fed into one input of adder 130 the second input of which receives term $\hat{\psi}_{n-1}$. The term $\hat{\psi}_n$ is used to address a conventional type sin and cos table which, then, provides quantities sin $\hat{\psi}_n$ and cos $\hat{\psi}_n$. These terms are used at the output of the device of FIG. 4 to adjust the phase of the echo equalizer EQ2 output components.

In summary, the listener echo tracking procedure according to this invention includes an initialization period comprised of a first step during which the echo canceller is disconnected, more specifically by setting the coefficients of echo equalizer EQ2, to zero. The emitter transmits a training data symbol sequence which, when received, is used to adjust the EQ1 equalizer of the receiver. Then, the same training sequence is used to determine a bulk delay KT of the echo by sorting those coefficients $g_l$ which are defined by expression (10), and by locating the largest coefficient $g_l$ for $0 < l < M$, M being a predetermined number. Once KT value is determined, it is used to shift the time reference origin to the echo impulse response position by introducing a bulk delay KT on the path of the decoded training symbol sequence. (This delay is maintained constant as long as the emitter-receiver connection remains unvaried). Then, the training sequence is used to generate a listener echo replica which is subtracted from the signal equalized by EQ1. Said echo replica is generated by using an automatic echo equalizer acting upon the decoded and bulk delayed data symbols and, in addition, operating an automatic adjustment of the replica phase in accordance with the listener echo phase shift. The automatic adjustments of the listener echo replica require echo tracking carried out according to operations expressed in equations (16) and (17).

While the invention has been particularly shown and described with reference to a preferred embodiment thereof, it will be understood by those skilled in the art that a number of changes in form and detail may be made therein without departing from the spirit and scope of this invention. One skilled in the art may, for instance, choose a non symmetrical equalizer EQ2, i.e. an equalizer having a delay line of a length L1 different from 2L+1, and modify the limits of "l" in expression (15) and in the following expressions, accordingly.

I claim:

1. In a data communication system which includes means for transmitting a normal electric carrier wave modulated by data symbols at a signaling rate of 1/T baud and means for receiving a said modulated wave and a delayed parasitic echo wave thereof, said echo wave exhibiting a phase shift ($\psi$) with respect to said normal modulated carrier wave, a method for canceling said delayed parasitic echo wave comprising at said receiver the steps:

measuring an estimated value of the delay (KT) between said normal and parasitic waves;

demodulating the received waves to detect the data symbols;

delaying the detected data symbols by said delay (KT);

measuring the discrete values ($\psi$n) of the said received wave echo phase shift ($\psi$) at predetermined time intervals nT, n being an integer value;

at said intervals generating discrete samples $q_n$ of a listener echo replica such that:

$$q_n = \sum_{l=-L}^{L} a_{n-\hat{K}-l} \hat{h}_l \exp j\hat{\psi}_n,$$

wherein:

$a_{n-\hat{K}-l}$ is an echo component of the received wave the symbol "^" means "estimated value of";

L is a predetermined integer value;

$j = \sqrt{-1}$;

$a_n$ is the data symbol received at the nth sampling time;

exp stands for exponential;

$h_l$ is representative of a coefficient derived at each sampling time through an iterative process according to the following expression:

$$\hat{h}_{l(n+1)} = \hat{h}_{l(n)} + \lambda_h \epsilon_n \exp -j\hat{\psi}_n \hat{a}_{n-\hat{K}-l}$$

with $\lambda_h$ being a predetermined numerical coefficient; and, $\epsilon_n$ being repesentative of the echo error value at time nT, which error is derived from the difference between the undetected and the detected received wave; and subtracting the said generated listener echo replica from the received undetected wave.

2. The method according to claim 1, wherein the measuring of the echo phase shift is derived through an interactive process in accordance with the following expression:

$$\hat{\psi}(n+1) = \hat{\psi}_n + \lambda_{104} Im q_n^* \exp = j\hat{\psi}_n$$

with $\lambda_n$ being a predetermined numerical coefficient;

Im being representative of the imaginary portion of the following complex expression; and

* being used to designate complex conjugate of the following complex expression.

3. A receiver for receiving a double-side band quadrature carrier modulated wave and for detecting therefrom data symbols $a_n$ at a signaling rate 1/T, said receiver including: sampling means for sampling said received wave and for deriving samples therefrom;

means for coding said samples; complex coding means connected to said coding means for deriving therefrom an in-phase component and a quadrature component of said coded received wave;

demodulating means connected to said complex coding means;

first equalizing and phase shifting means connected to said demodulating means, and, detecting means having an input connected to said first equalizing and phase shifting means, for detecting the data symbols modulated on the carrier wave;

said receiver further including a cancellor for canceling from the received wave a listner echo echo wave, which echo is a parasitic delayed wave adding itself during transmission to the transmitted wave;

said listener echo cancellor including:

delay estimating means connected to said first equalizing means for estimating a bulk delay (KT) between said parasitic wave and the said received wave absent said parasitic wave;

bulk delay means connected to said detecting means and responsive to the estimated bulk delay (KT); for adjusting the delay as a function of (KT);

echo error measuring means connected to said detecting means for measuring an echo error $\Sigma$;

echo phase shift tracking means connected to said echo error measuring means for providing echo phase shift information $\psi$;

echo replica generating means connected to said bulk delay means, said echo replica generating means including second equalizing means and echo phase adjusting means, for generating a replica of the echo; the generated replica (q) being defined by:

$$q_n = \sum_{l=-L}^{L} a_{n-\hat{K}-l} \hat{h}_l \exp j\hat{\psi}_n,$$

wherein:

$a_{n-\hat{K}-l}$ is an echo component of the received wave $q_n$ is the $n^{th}$ replica sample defined at time nT;

the sign "^" is meant for "estimated value of";

L is a predetermined integer value;

$\hat{h}_l$ is the value of the $l^{th}$ ranked coefficient of said second equalizing means, estimated at instant nT;

$\hat{\psi}_n$ is the echo phase shift value estimated at time nT; and, subtracting means connected to said echo replica generating means and to the input of said detecting means for subtracting said replica value therefrom.

4. A receiver according to claim 3 wherein said second equalizing means includes means for adjusting said coefficients $h_l$ in accordance with the following expression:

$$\hat{h}_{l(n+1)} = \hat{h}_{l(n)} + \lambda_h \epsilon_n \exp -j\hat{\psi}_n \hat{a}_{n-\hat{K}-l}$$

wherein:

$\lambda_h$ is a predetermined numerical coefficient; and, $\epsilon_n$ is the echo error value at time nT.

5. A receiver according to claim 3 or 4 wherein said echo phase shift tracking means generates phase shift information according to the following expression:

$$\hat{\psi}_{(n+1)} = \hat{\psi}_n + \lambda_\psi Im q_n^* \exp -j\hat{\psi}_n$$

wherein:

$\lambda_\psi$ is a predetermined numerical coefficient;

Im is representative of the imaginary portion of the complex expression following;

* is used to designate complex conjugate expression.

* * * * *